United States Patent
Bhooi et al.

(10) Patent No.: US 11,765,400 B2
(45) Date of Patent: *Sep. 19, 2023

(54) SYSTEMS AND METHODS FOR SELECTING AN INITIAL STREAMING BITRATE

(71) Applicant: SLING MEDIA PVT LTD, Bangaluru (IN)

(72) Inventors: Jeevan Satpalsingh Bhooi, Bangalore (IN); Senthilkumar Krishnadoss, Bangalore (IN)

(73) Assignee: DISH Network Technologies India Private Limited

( * ) Notice: Subject to any disclaimer, the term of this patent is extended or adjusted under 35 U.S.C. 154(b) by 0 days.

This patent is subject to a terminal disclaimer.

(21) Appl. No.: 17/456,820

(22) Filed: Nov. 29, 2021

(65) Prior Publication Data

US 2022/0094991 A1 Mar. 24, 2022

Related U.S. Application Data

(63) Continuation of application No. 16/830,768, filed on Mar. 26, 2020, now Pat. No. 11,206,431, which is a
(Continued)

(51) Int. Cl.
*H04N 21/20* (2011.01)
*H04N 21/4402* (2011.01)
(Continued)

(52) U.S. Cl.
CPC ............. *H04N 21/20* (2013.01); *H04L 65/60* (2013.01); *H04L 65/80* (2013.01);
(Continued)

(58) Field of Classification Search
None
See application file for complete search history.

(56) References Cited

U.S. PATENT DOCUMENTS 8,099,755 B2  1/2012 Bajpai et al.
8,516,144 B2  8/2013 Hsu
(Continued)

FOREIGN PATENT DOCUMENTS

EP   2717536 A1   4/2014
WO  2011035443 A1  3/2011
WO  2013030852 A2  8/2011

OTHER PUBLICATIONS

EPO, International Search Report issued in IA Appl. No. PCT/IN2018/050811, dated Feb. 21, 2019.

*Primary Examiner* — Omar S Parra
(74) *Attorney, Agent, or Firm* — KW Law, LLP

(57) ABSTRACT

Systems and methods are described for providing a media stream transmitted from an encoding system to a remotely-located media player that requests segments of the media stream. In accordance with one embodiment, a method of encoding a media stream provided from an encoding system to a remotely-located client includes establishing a data connection with the client and acquiring, from the client, client information including a client identifier, a public internet protocol (IP) address, and a geographical location associated with the client. The method further includes determining, based on the client information, whether historical bit rate data is available in a historical bit rate data store provided by the encoding system. If such historical bit rate data is available, an initial bit rate parameter is set for the media stream and the media stream is encoded at the encoding system according to the initial bit rate parameter and transmitted to the client.

10 Claims, 6 Drawing Sheets

Related U.S. Application Data continuation of application No. 15/835,645, filed on Dec. 8, 2017, now Pat. No. 10,652,589.

(51) Int. Cl.
  *H04L 65/80* (2022.01)
  *H04N 21/24* (2011.01)
  *H04L 65/60* (2022.01)
  H04L 65/612 (2022.01)
  H04N 21/63 (2011.01)

(52) U.S. Cl.
  CPC ..... *H04N 21/2402* (2013.01); *H04N 21/4402* (2013.01); *H04L 65/612* (2022.05); *H04N 21/63* (2013.01)

(56) References Cited

U.S. PATENT DOCUMENTS

| | | | |
|---|---|---|---|
| 10,148,716 B1 * | 12/2018 | Joseph | G06F 16/16 |
| 10,227,810 B2 | 3/2019 | Linden et al. | |
| 2011/0035443 A1 | 2/2011 | Jensen | |
| 2014/0297813 A1 * | 10/2014 | Gomes | H04N 21/6379 709/219 |
| 2015/0089079 A1 | 3/2015 | Knittle | |
| 2015/0372927 A1 | 12/2015 | Lv | |
| 2018/0027039 A1 | 1/2018 | Moorthy et al. | |
| 2018/0338146 A1 | 11/2018 | John | |

* cited by examiner

| Transition | | | Condition Check | | |
|---|---|---|---|---|---|
| Prev Zone | Curr Zone | For? | Minimum time between a previous change and this check | Condition | If TRUE, newSet = (Kbps) |
| | | Up | 0s | (NET > SET) && (SET < 50% PEAKSET) | 50% PEAKSET ⎫ 501 |
| | | Up | 2s | (NET > SET) && (SET < 80% PEAKSET) | MIN(120% SET, 300) ⎫ 502 |
| | | Up | 2s | (NET > SET) && (NsendT < 500ms) | MIN(110% SET, 300) ⎫ 503 |
| | | Up | 5s | (NET > SET) && (NsendT < 80%SEGDURATION) | MIN(110% SET, 100) ⎫ 504 |
| Any | BONUS | Dn | 500ms | (NET < SET) && (NsendT > 70%SEGDURATION) && (Cbuf >Pbuf) | 90% ACTIVENET ⎫ 505 |
| | GREEN | Dn | 500ms | (NET < SET) && (NsendT > 70%SEGDURATION) && (Cbuf >Pbuf) | 90% ACTIVENET ⎫ 506 |
| Any | YELLOW | Dn | 500ms | (NET < SET) && (Cbuf >Pbuf) | 70% SET ⎫ 507 |
| Any | RED | Dn | 500ms | (NET < SET) && (Cbuf >Pbuf) | 60% SET ⎫ 508 |
| Any | Flush | Dn | 500ms | | 50% SET ⎫ 509 |

| PUBLIC IP DDR | CLIENT ID | BITRATE |
|---|---|---|
| 611 ---,---,---,--- | 621 ---------------- | 631 ---- |
| 612 ---,---,---,--- | 622 ---------------- | 632 ---- |
| ---,---,---,--- | ---------------- | ---- |
| ---,---,---,--- | ---------------- | ---- |
| ⋮ | ⋮ | ⋮ |

FIG.7

| PUBLIC IP DDR | CLIENT ID | LOCATION | BITRATE |
|---|---|---|---|
| 711 ---,---,---,--- | 721 ---------------- | 731 --- --- --- | 741 ---- |
| 712 ---,---,---,--- | 722 ---------------- | 732 --- --- --- | 742 ---- |
| 713 ---,---,---,--- | 723 ---------------- | 733 --- --- --- | 743 ---- |
| ⋮ | ⋮ | ⋮ | |

SYSTEMS AND METHODS FOR SELECTING AN INITIAL STREAMING BITRATE

CROSS-REFERENCE TO RELATED APPLICATIONS

This application is a continuation application of parent U.S. application Ser. No. 16/830,768 filed on Mar. 26, 2020, which is a continuation of the U.S. application Ser. No. 15/835,645 filed on Dec. 8, 2017, both applications are incorporated herein by reference in their entirety.

TECHNICAL FIELD

The present subject matter generally relates to systems and methods for controlling the encoding of a bitstream transmitted over network, and more particularly relates to methods for optimizing the initial bitrate used by such systems.

BACKGROUND

Place shifting devices typically packetize media content that can be transmitted over a local or wide area network to a portable computer, mobile phone, personal digital assistant, remote television or other remote device capable of playing back the packetized media stream for the viewer. Placeshifting therefore allows consumers to view their media content from remote locations such as other rooms, hotels, offices, and/or any other locations where portable media player devices can gain access to a wireless or other communications network.

While placeshifting greatly improves the convenience afforded to the viewer, challenges can arise in effectively creating and transmitting the encoded media stream. The variety of network environments (e.g., LAN, WAN, Internet, wireless telephone, etc.) that may be supported can lead to significant variations in bit rate and other parameters over time. Furthermore, it can take a significant amount of time for the bit rate between a client and server to reach an equilibrium or optimal value, since the initial bit rate is often set, initially, to a low, default bit rate value (and is adjusted upward as streaming commences).

It is therefore desirable to create systems and methods for controlling the encoding of a segmented media stream that is transmitted over a network or other data connection. These and other desirable features and characteristics will become apparent from the subsequent detailed description and the appended claims, taken in conjunction with the accompanying drawings and this background section.

BRIEF SUMMARY

According to various exemplary embodiments, systems and methods are described for providing an encoded media stream that is made up of multiple segments.

In accordance with one embodiment, a method of encoding a media stream provided from an encoding system to a remotely-located client includes establishing a data connection with the client and acquiring, from the client, client information including a client identifier, a public internet protocol (IP) address, and a geographical location associated with the client. The method further includes determining, based on the client information, whether historical bit rate data is available in a historical bit rate data store provided by the encoding system. If such historical bit rate data is available, an initial bit rate parameter is set for the media stream and the media stream is encoded at the encoding system according to the initial bit rate parameter and transmitted to the client.

In accordance with another embodiment, a media encoding system for providing a media stream to a client over a network includes a historical bit rate data store configured to store a plurality of public IP addresses, a plurality of corresponding client identifiers, a plurality of corresponding geographical locations, and a plurality of corresponding bit rate parameters. The system further includes a media encoding module configured to: acquire, from the client, client information including a client identifier, a public internet protocol (IP) address, and a geographical location associated with the client; query the historical bit rate data store to determine whether historical bit rate data is available based on the client information; and, if such historical bit rate data is available, set an initial bit rate parameter for the media stream. The system further includes a network interface configured receive requests for the media stream and to transmit the encoded media stream to the client over the network, and a control module configured to adjust the bit rate parameter for encoding of subsequent segments in real time based upon a transmit time of at least one of the segments.

BRIEF DESCRIPTION OF THE DRAWING FIGURES

Exemplary embodiments will hereinafter be described in conjunction with the following drawing figures, wherein like numerals denote like elements, and FIG. 1 is a block diagram of an exemplary system for encoding segmented media streams;

FIG. 5 is a diagram of an exemplary encoding structure that considers segment transmit times;

FIG. 6 depicts a bit rate data structure in accordance with one embodiment;

FIG. 7 depicts a bit rate data structure in accordance with another embodiment;

DETAILED DESCRIPTION

Figure 1:
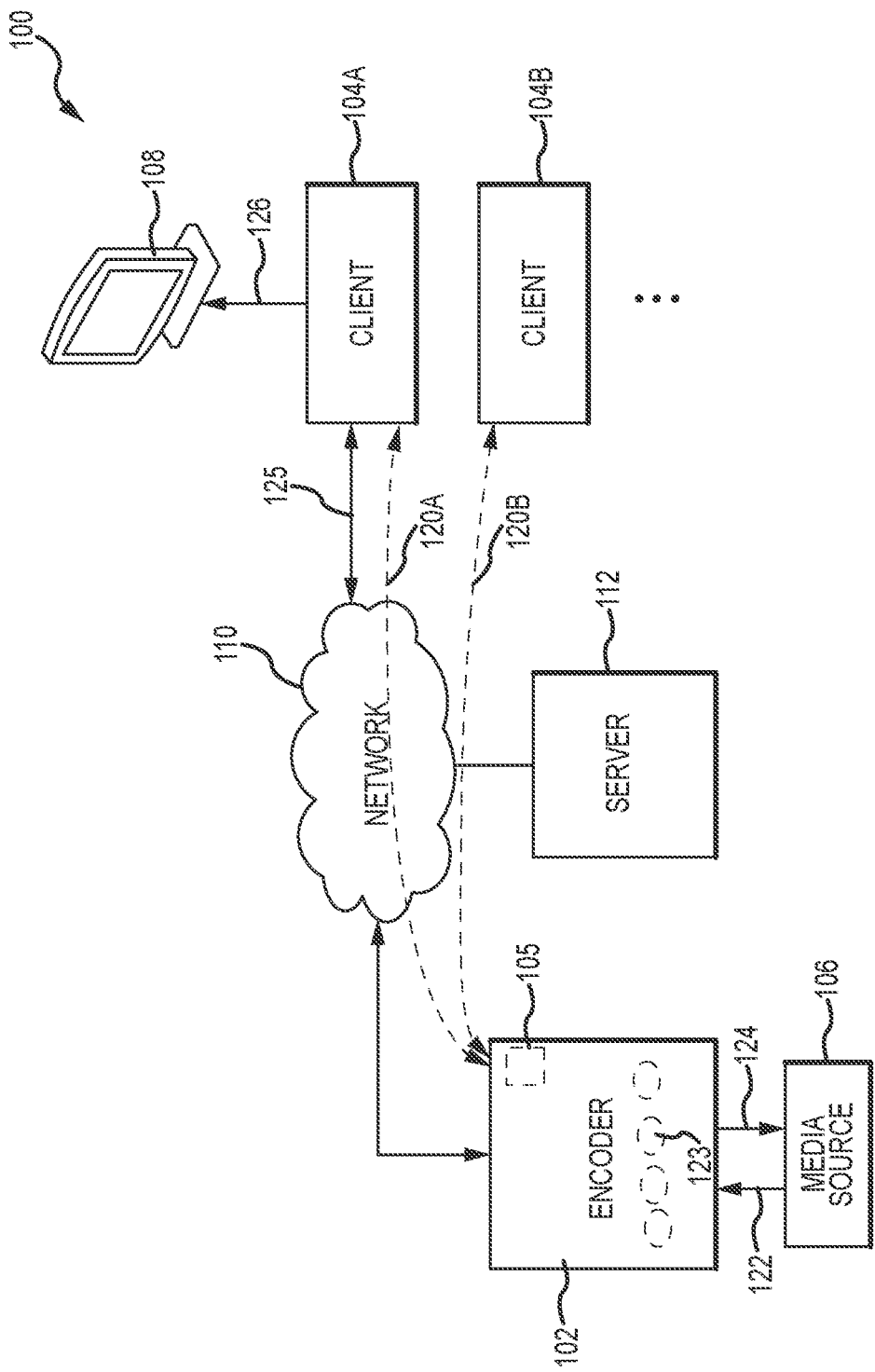

The following detailed description of the invention is merely exemplary in nature and is not intended to limit the invention or the application and uses of the invention. Furthermore, there is no intention to be bound by any theory presented in the preceding background or the following detailed description.

According to various embodiments, the initial bit rate parameter established at the beginning of a media streaming session between a client and an encoder system is selected based on historical bit rate information, when available to the encoder system. That is, an initial bit rate may be selected based on the public IP address, the client ID, and/or the geographical location of the client during previous streaming sessions. In this way, an optimum bit rate can be achieved more quickly. The bit rate parameter can then be adjusted upwardly or downwardly as appropriate to take advantage of excess network capacity, or to avoid transmit delays that may impact the viewer's experience. Segment transmit time may be considered in place of or in addition to the occupancy of a transmit buffer, and/or any other factors as desired. By adjusting the encoding of subsequent segments of the media stream with consideration to the actual times to transmit previous segments, system behavior and/or the user experience can be significantly improved.

In many placeshifting situations, it is often desirable (if not necessary) to encode the media stream in relative real time as the content is received. If the user wishes to view a live television program, for example, signals representing the program are typically encoded (or transcoded) into network-transmittable format as the signal is received by the encoder. Even if the viewer is watching a media stream based upon previously-stored content (e.g., a program stored on a DVR or similar media), the encoder typically creates the network-routable stream at the same time that the stream is transmitted to the viewer. One disadvantage of real-time encoding is that sufficient computing and transmitting resources must be available to maintain the real-time stream, or the viewer's experience can be degraded.

On the other hand, real-time encoding allows the encoding to be adjusted to compensate for variations in network conditions, user preferences, and other factors that may arise. Encoding may be adjusted upwardly or downwardly, for example, to compensate for bandwidth fluctuations or differences in player capabilities. That is, a media stream with a lower bit rate, frame rate and/or resolution can be provided when the client capabilities or network are only able to support the lower quality stream, while maintaining the capability to deliver a higher quality (but higher bandwidth) stream as conditions allow. One example of such a system is described in US Patent Publication No. 2009/0103607. In that example, the utilization of the transmit buffer in the placeshifting device can be used as an estimate of network bandwidth, and encoder quality can be adjusted accordingly.

During a streaming session in which the client synchronously requests segments of a media stream from a server, further adjustments may be made to compensate for segment delivery times and/or other temporal factors. If no client request is active during a synchronous time period, for example, then unused bandwidth may be available. Bandwidth may also be available when a particular request is delayed due to network latency or other factors. In either of these cases, a quality scheme that only considers network bandwidth may improperly conclude that stream quality should be upgraded to take advantage of available bandwidth. When subsequent requests arrive, however, this situation may create a bottleneck if the bandwidth to accommodate the quality upgrade is not in fact available. Other implementations that only consider bandwidth could improperly conclude that stream quality should be downgraded under similar conditions because buffer occupancy will typically increase if there is no request, or if the request is delayed.

It is therefore desirable to consider factors other than bandwidth during request response streaming models, and/or in other situations as appropriate. Rather than simply setting encoder quality based upon the bandwidth of the network, various embodiments suitably differentiate between available bandwidth caused by network fluctuations and available bandwidth caused by the lack of active requests for data. In the former case, encoding can be adjusted as desired; in the latter, it may be desirable to avoid making changes that could create issues for future requests.

Moreover, it may be desirable in some situations to adjust the encoding to compensate for transmission delays even if bandwidth conditions might dictate that no adjustment is otherwise necessary. A high bandwidth but low latency data connection could justify lower encoding quality than would otherwise be available to ensure sufficient roundtrip transit times for segment requests and segment deliveries to the client.

Still further, there may be situations in which the transmit buffer is filled for reasons unrelated to available bandwidth. As noted above, the buffer may fill because no recent request has been received. In this situation, it may be desirable to simply maintain current encoding parameters rather than "downshifting" or degrading the quality of the media stream while waiting for subsequent requests to arrive, so long as the buffer is not in danger of overflowing.

It is therefore desirable to adapt the encoding of the media stream with consideration to the request-response nature of some streaming techniques. Parameters that may be considered could include, in various embodiments, the time taken to send one or more segments in the data connection, the throughput achieved during active segment sends in the data connection, the transmit buffer occupancy in terms of duration at periodic intervals (or the like), and/or other factors as appropriate. Additional detail of an exemplary embodiment is provided below.

Turning now to the drawing figures and with initial reference to FIG. 1, an exemplary placeshifting system 100 suitably includes a placeshifting encoder system 102 that receives media content 122 from a content source 106, encodes the received content into a streaming format that includes multiple segments 123, and then transmits the segments 123 of encoded media streams 120 (e.g., 120A, 120B, etc.) to one or more media players 104 (e.g., 104A, 104B, etc.) over network 110. The media player 104 suitably receives the encoded stream 120, decodes the stream, and presents the decoded content to a viewer on a television or other display 108. In various embodiments, a server 112 may also be provided to communicate with encoder system 102 and/or player 104 via network 110 to assist these devices in locating each other, maintaining security, providing or receiving content or information, and/or any other features as desired. This feature is not required in all embodiments, however, and the concepts described herein may be deployed in any data streaming application or environment, including placeshifting but also any other media or other data streaming situation.

Placeshifting encoder system 102 is any component, hardware, software logic and/or the like capable of transmitting a packetized stream of media content over network 110. In various embodiments, placeshifting device 102 incorporates suitable encoder and/or transcoder (collectively "encoder") logic to convert audio/video or other media data 122 into a packetized format that can be transmitted over network 110. The media data 122 may be received in any format and may be received from any internal or external source 106 such as any sort of broadcast, cable or satellite television programming source, a "video-on-demand" or similar source, a digital video disk (DVD) or other removable media, a video camera, and/or the like. Encoder system 102 encodes media data 122 to create media stream 120 in any manner. In various embodiments, encoder system 102 contains a transmit buffer 105 that temporarily stores encoded data prior to transmission on network 110. As buffer 105 fills or empties, one or more parameters of the encoding (e.g., the bit rate of media stream 120) may be adjusted to maintain desirable picture quality and data throughput in view of the then-current network performance. As described more fully below, various embodiments are able to calculate a current encoding rate based upon network transfer rate, times to transmit segments, and/or other factors, and to adjust the encoding rate as changing conditions warrant. Changes in the encoding parameters may be triggered by, for example, changes in the utilization of the outgoing buffer 105 or changes in segment transit times, as desired.

Several examples of encoding systems 102 may be implemented using any of the various SLINGBOX products available from Sling Media of Foster City, Calif., although other products could be used in other embodiments. Many different types of encoder systems 102 are generally capable of receiving media content 122 from an external source 106 such as any sort of digital video recorder (DVR), set top box (STB), cable or satellite programming source, DVD player, and/or the like. In such embodiments, encoder system 102 may additionally provide commands 124 to the source 106 to produce desired signals 122. Such commands 124 may be provided over any sort of wired or wireless interface, such as an infrared or other wireless transmitter that emulates remote control commands receivable by the source 106. Other embodiments, however, particularly those that do not involve placeshifting, may modify or omit this feature entirely.

In other embodiments, encoder system 102 may be integrated with any sort of content receiving or other capabilities typically affiliated with source 106. Encoder system 102 may be a hybrid STB or other receiver, for example, that also provides transcoding and placeshifting features. Such a device may receive satellite, cable, broadcast and/or other signals that encode television programming or other content received from an antenna, modem, server and/or other source. The receiver may further demodulate or otherwise decode the received signals to extract programming that can be locally viewed and/or place shifted to a remote player 104 as appropriate. Such devices 102 may also include a content database stored on a hard disk drive, memory, or other storage medium to support a personal or digital video recorder (DVR) feature or other content library as appropriate. Hence, in some embodiments, source 106 and encoder system 102 may be physically and/or logically contained within a common component, housing or chassis.

In still other embodiments, encoder system 102 is a software program, applet or the like executing on a conventional computing system (e.g., a personal computer). In such embodiments, encoder system 102 may encode, for example, some or all of a screen display typically provided to a user of the computing system for placeshifting to a remote location. One device capable of providing such functionality is the Sling Projector product available from Sling Media of Foster City, Calif., which executes on a conventional personal computer, although other products could be used as well.

Media player 104 is any device, component, module, hardware, software and/or the like capable of receiving a media stream 120 from one or more encoder systems 102. In various embodiments, remote player 104 is personal computer (e.g., a "laptop" or similarly portable computer, although desktop-type computers could also be used), a mobile phone, a personal digital assistant, a personal media player or the like. In many embodiments, remote player 104 is a general purpose computing device that includes a media player application in software or firmware that is capable of securely connecting to placeshifting encoder system 102, as described more fully below, and of receiving and presenting media content to the user of the device as appropriate. In other embodiments, however, media player 104 is a standalone or other separate hardware device capable of receiving the media stream 120 via any portion of network 110 and decoding the media stream 120 to provide an output signal 126 that is presented on a television or other display 108. One example of a standalone media receiver 104 is the SLINGCATCHER product available from Sling Media of Foster City, Calif., although other products could be equivalently used.

Network 110 is any digital or other communications network capable of transmitting messages between senders (e.g., encoder system 102) and receivers (e.g., receiver 104). In various embodiments, network 110 includes any number of public or private data connections, links or networks supporting any number of communications protocols. Network 110 may include the Internet, for example, or any other network based upon TCP/IP or other conventional protocols. In various embodiments, network 110 also incorporates a wireless and/or wired telephone network, such as a cellular communications network for communicating with mobile phones, personal digital assistants, and/or the like. Network 110 may also incorporate any sort of wireless or wired local area networks, such as one or more IEEE 802.3 and/or IEEE 802.11 networks.

Encoder system 102 and/or player 104 are therefore able to communicate with player 104 in any manner (e.g., using any sort of data connections 128 and/or 125, respectively). Such communication may take place over a wide area link that includes the Internet and/or a telephone network, for example; in other embodiments, communications between devices 102 and 104 may take place over one or more wired or wireless local area links that are conceptually incorporated within network 110. In various equivalent embodiments, encoder system 102 and receiver 104 may be directly connected via any sort of cable (e.g., an Ethernet cable or the like) with little or no other network functionality provided.

Many different placeshifting scenarios could be formulated based upon available computing and communications resources, consumer demand and/or any other factors. In various embodiments, consumers may wish to placeshift content within a home, office or other structure, such as from a placeshifting encoder system 102 to a desktop or portable computer located in another room. In such embodiments, the content stream will typically be provided over a wired or wireless local area network operating within the structure. In other embodiments, consumers may wish to placeshift content over a broadband or similar network connection from a primary location to a computer or other remote player 104 located in a second home, office, hotel or other remote location. In still other embodiments, consumers may wish to placeshift content to a mobile phone, personal digital assistant, media player, video game player, automotive or other vehicle media player, and/or other device via a mobile link (e.g., a GSM/EDGE or CDMA/EVDO connection, any sort of 3G, 4G or subsequent telephone link, an IEEE 802.11 "Wi-fi" link, and/or the like). Several examples of placeshifting applications available for various platforms are provided by Sling Media of Foster City, Calif., although the concepts described herein could be used in conjunction with products and services available from any source.

Encoder system 102, then, generally creates a media stream 120 that is routable on network 110 based upon content 122 received from media source 106. As noted above, the media stream delivered to the client can be split into individual segments that may be transmittable in a file-based scheme (e.g., HTML or the like) for delivery to media client 104. Each segment may represent any duration of the video content, and segments may be individually encoded from the input signal 122 using any appropriate parameters, as described more fully below. In an exemplary embodiment, segments may represent portions of the content on the order of one or more milliseconds or so, although other embodiments could use segments of any duration, including segments lasting on the order of a second or more. Each segment is then transmitted as part of media stream 120 in response to a request for the segment that is received from the client 104. Requests may be received via a control connection (e.g., connection 125 in FIG. 1) or the like; in some embodiments, requests may simply be HTTP "GET"-type instructions or similar HTML-5 structures that request the particular segment 123 of stream 120. As bandwidth and/or segment transmit time changes, the encoding of future segments 123 can be appropriately modified as desired. In various embodiments, media player 104 can assist in reporting transit times for segments 123 to encoder 102 via connection 125 or the like; in other embodiments, encoder 102 suitably estimates transmit times based upon the times between consecutive segment requests received from media player 104, based upon observed time for the segment 123 to leave buffer 105, and/or based upon any other factor.

Figure 2:
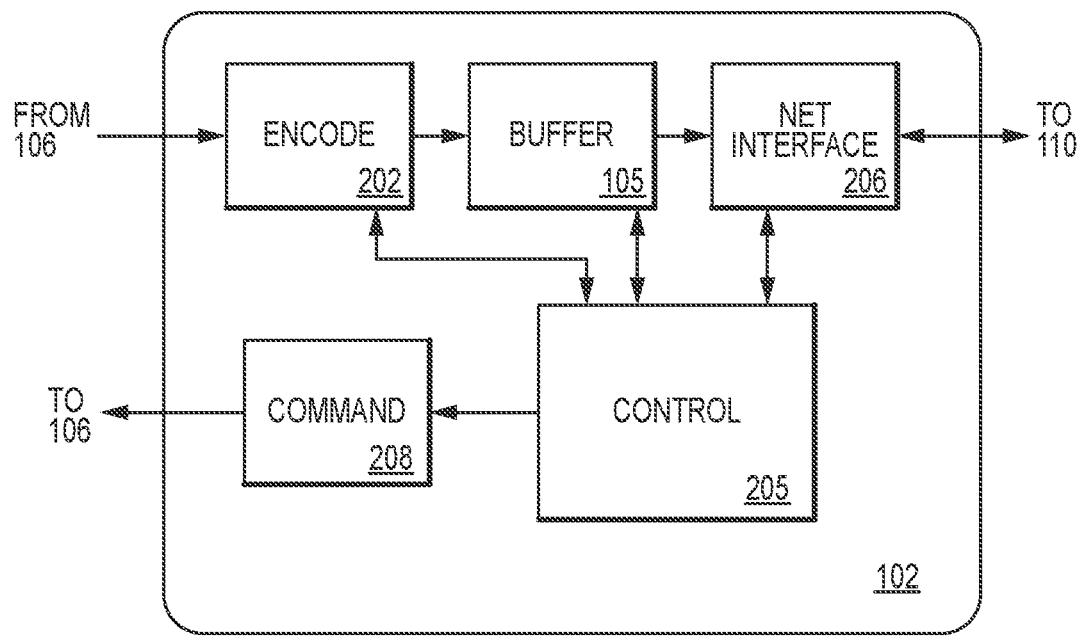
FIG. 2 is a block diagram of an exemplary media encoding device.

To that end, and with reference now to FIG. 2, encoder system 102 typically includes an encoder module 202, a buffer 105 and a network interface 206 in conjunction with appropriate control logic 205. In operation, encoder module 202 typically receives media content 122 from an internal or external source 106, encodes a portion of the received content 122 as a segment (or in any other desired format) for media stream 120 as it is received, and stores the encoded segment in buffer 105. Network interface 206 then retrieves the formatted segment from buffer 105 for transmission on network 110 in response to a request received from media player 104. Control module 205 suitably monitors and controls the encoding and network transmit processes carried out by encoding module 202 and network interface 206, respectively, and may perform other features as well. Encoder system 102 may also have a module 208 or other feature capable of generating and providing commands 124 to an external media source 106, as described above.

In the exemplary embodiment shown in FIG. 2, modules 202, 105, 205, 206 and 208 may be implemented in software or firmware residing in any memory, mass storage or other storage medium within encoder system 102 in source code, object code and/or any other format. Such features may be executed on any sort of processor or microcontroller executing within encoder system 102. In various embodiments, encoder system 102 is implemented as a system on a chip (SoC) type system with integrated processing, storage and input/output features. Various SoC hardware implementations are available from Texas Instruments, Conexant Systems, Broadcom Inc., and other suppliers as appropriate. Other embodiments may use any number of discrete and/or integrated processing components, memories, input/output features and/or other features as desired.

As noted above, creating a media stream 120 typically involves encoding and/or transcoding an input media stream 122 received from an internal or external media source 106 into segments or another suitable digital format that can be transmitted on network 110. Generally, the media stream 120 is placed into a standard or other known format (e.g., the WINDOWS MEDIA format available from the Microsoft Corporation of Redmond, Wash. although other formats such as the FLASH format, QUICKTIME format, REAL-PLAYER format, MPEG format, and/or the like could be used in any other embodiments) that can be transmitted on network 110. This encoding may take place, for example, in any sort of encoding module 202 as appropriate. Encoding module 202 may be any sort of hardware (e.g., a digital signal processor or other integrated circuit used for media encoding), software (e.g., software or firmware programming used for media encoding that executes on the SoC or other processor described above), or the like. Encoding module 202 is therefore any feature that receives media data 122 from the internal or external source 106 (e.g., via any sort of hardware and/or software interface) and encodes or transcodes the received data into the desired format for transmission on network 110. Although FIG. 2 shows a single encoding module 202, in practice system 102 may include any number of encoding modules 202. Different encoding modules 202 may be selected based upon preference of player 104, network conditions, and/or the like.

In various embodiments, encoder 202 may also apply other modifications, transforms and/or filters to the received content before or during the transcoding process. Video signals, for example, may be resized, cropped and/or skewed. Similarly, the color, hue and/or saturation of the signal may be altered, and/or noise reduction or other filtering may be applied. Audio signals may be modified by adjusting volume, sampling rate, mono/stereo parameters, noise reduction, multi-channel sound parameters and/or the like. Digital rights management encoding and/or decoding may also be applied in some embodiments, and/or other features may be applied as desired.

As noted above, one or more parameters of the encoding process (e.g., the bit rate, frame rate, image resolution and/or other parameters) may be adjusted during the encoding process to produce a media stream 120 that is modified or tuned to the then-current conditions of network 110 and/or media player 104. The encoding bit rate, for example, can be adjusted in response to a measured capability of network 110 and/or segment transmit times, as desired. That is, bit rate may be increased when conditions are able to accommodate the higher rate; conversely, the bit rate can be decreased when conditions are less able to accommodate the greater demands By adjusting the of the encoding process in response to the network performance, the user experience can be greatly improved. Equivalent embodiments may adjust the frame rate, resolution and/or other parameters in addition to or in place of the bit rate, as appropriate.

Network interface 206 refers to any hardware, software and/or firmware that allows encoding system 102 to communicate on network 11. In various embodiments, network interface 206 includes suitable network stack programming and other features and/or conventional network interface (NIC) hardware such as any wired or wireless interface as desired.

In various embodiments, control module 205 monitors and controls the encoding and transmit processes performed by encoding module 202 and network interface 206, respectively. To that end, control module 205 is any hardware, software, firmware or combination thereof capable of performing such features. In various embodiments, control module 205 further processes commands received from the remote player via network interface 206 (e.g., by sending commands 124 to the media source 106 via a command module 208 or the like). Control module 205 may also transmit commands to the remote player 104 via network interface 206 and/or may control or otherwise affect any other operations of the encoder system 102. In various embodiments, control module 205 implements the control features used to monitor and adjust the operation of encoder 202 and/or network interface 106 to efficiently provide the media stream to remote player 104.

As noted above, various techniques for monitoring the capability of network 110 involves monitoring the fullness and/or utilization of a buffer 105 in the encoder system 102 as well as the rates at which the buffer 105 fills and empties. This buffer utilization information may be supplemented, in some embodiments, with segment timing information, as desired. Buffer 105 is typically any sort of hardware and/or software feature capable of temporarily storing encoded data prior to transmission on network 110. Typically, buffer 105 is implemented in a portion of memory or mass storage associated with encoder 101. If buffer 105 remains relatively empty, then the data transmission rate can be deduced to be relatively well-matched to the data encoding rate. That is, data is being transmitted at approximately the same rate that it is being encoded. If the buffer 105 is filling, however, this indicates that the encoder is generating data faster than the network 110 can transmit the data.

Figure 3:
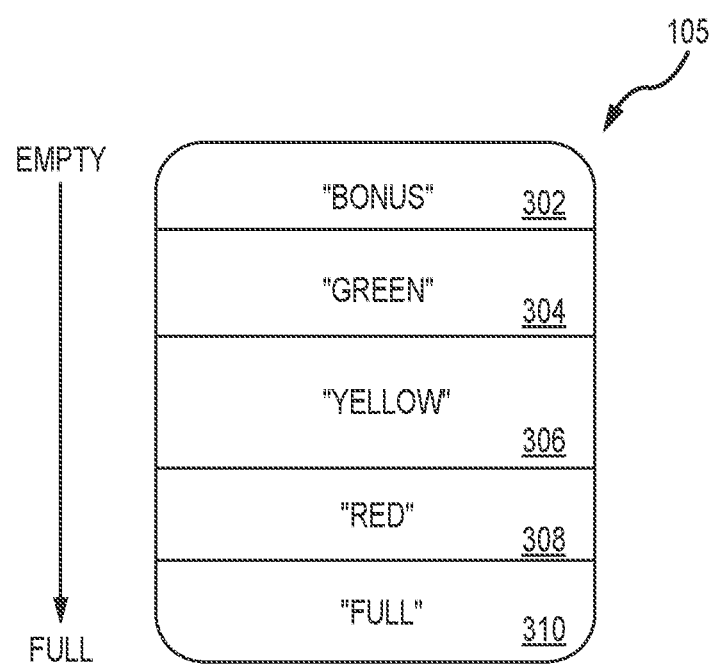
FIG. 3 is a diagram of an exemplary category/watermark structure that may be useful in describing certain buffer conditions.

FIG. 3 shows one example of a category/watermark structure that may be useful in describing certain conditions of buffer 105, and that may be used to adjust the encoding of future segments in media stream 120. In the exemplary embodiment of FIG. 3, the top of buffer 105 represents an empty state with little or no buffered data present, and the bottom of buffer 105 represents a full state with relatively little or no space available for buffering additional data. As noted in FIG. 3, the amount of available space in buffer 105 may be represented by various exemplary states 302 ("Bonus"), 304 ("Green"), 306 ("Yellow"), 308 ("Red") and 310 ("Full"). Other embodiments may use any number of states having different relative sizes, descriptors or other features. In the example of FIG. 3, a "Bonus" state 302 may be considered to be a state of relative buffer emptiness (e.g., less than about 15% or so) when relatively aggressive parameters may be used. The "Green" state 304 may represent some data in buffer 105 (e.g., about 15-30% or so), but with a substantial portion of the buffer remaining available for use. "Yellow" state 306 may represent somewhat more filling of buffer 105 (e.g., about 30-70% or so), with the "Red" state representing a condition of relative buffer fullness (e.g., about 70-85% or so). The "full" state may represent conditions wherein the buffer is simply flushed (e.g., data is discarded) to avoid overflow. This condition may create gaps in the content stream presented to the viewer, however. As noted above, other embodiments may use any number of widely-varying states 302-310 to describe buffer 105, with any state or combination of states having any size, upper or lower boundary, or other parameters as desired.

In a conventional environment, the boundaries between various states 302-310 may represent "watermarks" that indicate transition points wherein the encoding parameter is adjusted upwardly and/or downwardly. As the buffer utilization moves from the "yellow" state 306 to the "green" state 304, for example, encoding quality may be increased to take advantage of the excess capacity. Similarly, quality may be decreased as the buffer utilization breaches a watermark from the top (as shown in FIG. 3) toward the bottom of the figure.

In various embodiments, this broad concept of watermarks can be expanded to even further improve performance. Rather than limiting parameter changes to occurrences of watermark breaches, for example, adjustments may be made within categories (or otherwise) based upon the actual measured/observed values of the encoder rate, buffer capacity and/or segment transmit times. For example, the encoding may be adjusted based upon a specific amount that is tailored to the actual conditions rather than simply adjusting in accordance with a pre-determined amount that was empirically or otherwise determined at a different time. Further, different actions may be taken at different levels of operation. More aggressive encoding (e.g., increasing segment quality), for example, can be performed at the higher levels (e.g., "bonus" level 302 or "green" level 304) in comparison to the lower levels. Hence, it may be possible and desirable to increase the segment quality during "green" operation even if a watermark has not been crossed. Similarly, it may be desirable to maintain the quality at a lower level during "red" or "yellow" operation, even following a watermark transition, to let the buffer empty somewhat before making more aggressive parameter changes. Rather than simply adjusting encoding upwardly or downwardly in response to watermark transitions, then, more advanced processing can be used to obtain better performance and/or better asset utilization. Additional details of an exemplary implementation are set forth below.

Some embodiments may further retain the use of watermark structures (such as the structure 300 shown in FIG. 3) for convenience, backward compatibility, compensation for measurement, computation or other tolerances, and/or the like. In various embodiments, the particular levels represented by one or more watermarks may be adjusted upwardly or downwardly during operation as desired to reflect the current state of encoding and transmission. Generally, the watermarks can be varied as a function of any known and measurable parameters such as network capacity, encoder bitrate, segment transmit time, video width & height, and/or other factors as appropriate.

Figure 4:
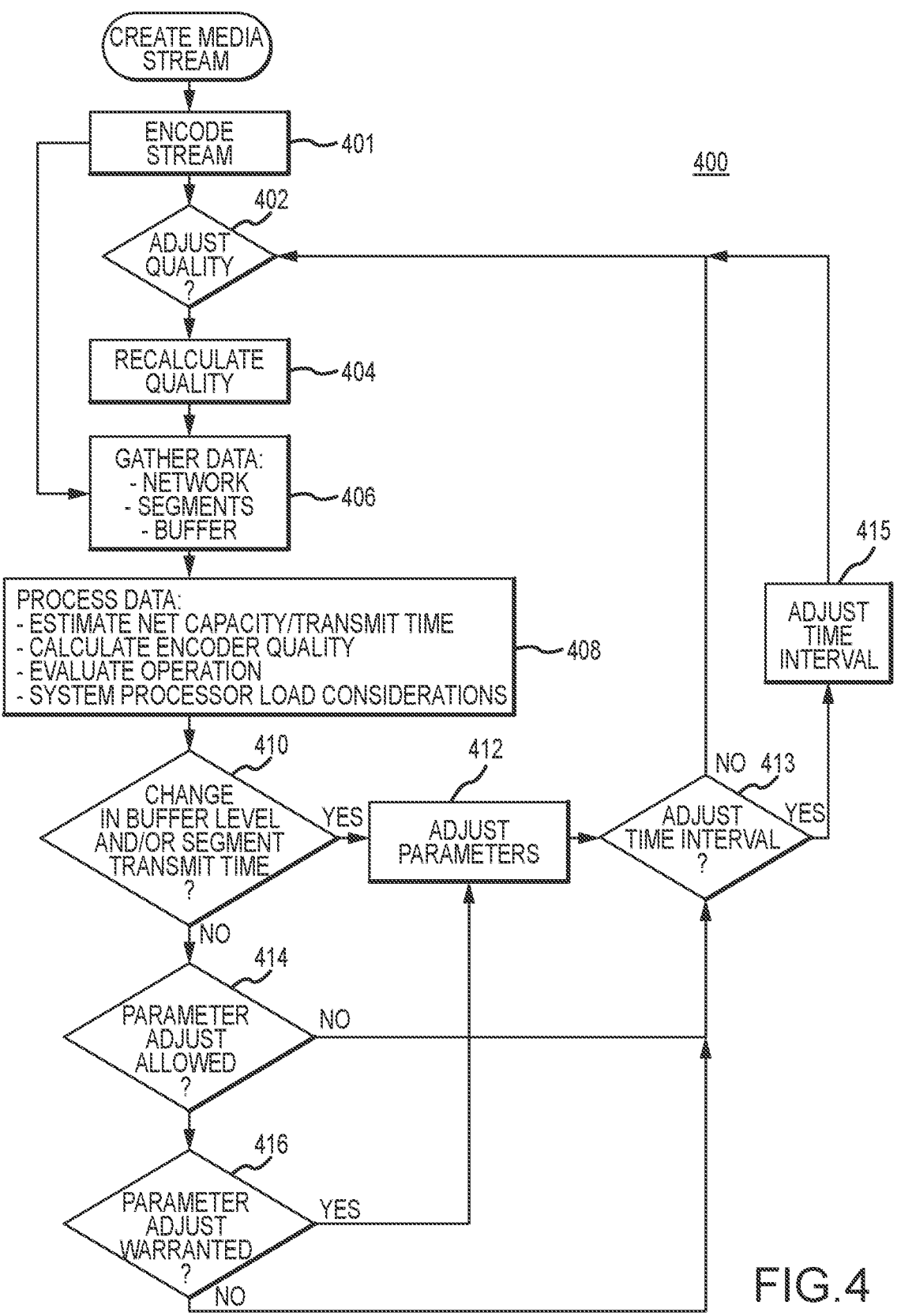
FIG. 4 is a flowchart of an exemplary process for controlling the encoding of a segmented media stream.

Turning now to FIG. 4, an exemplary method 400 for controlling the encoding of a segmented media stream 120 suitably includes the broad steps of gathering data (step 406), processing the gathered data (step 408), adjusting one or more encoding parameters (steps 412, 415) at appropriate times (steps 410, 414, 416), and adjusting the encoding quality at appropriate times (steps 402, 404). Generally speaking, the various steps of method 400 may be carried out with any sort of hardware, software and/or firmware logic within encoder system 102. Method 400 may be carried out, for example, by control logic 205 (FIG. 2) operating in conjunction with encoder logic 202, buffer 105 and network interface 206 as appropriate. In various embodiments, the various steps of method 400 are carried out in response to software or firmware instructions stored in a memory, or on a disk drive and/or other storage associated with encoder system 102. Such instructions may be executed by any processor and/or other processing features within the encoder system 102 or the like. The particular means used to implement each of the various functions shown in FIG. 4, then, could be any sort of processing hardware (such as controller 205 of FIG. 2) executing conventional software logic in any format.

Generally speaking, quality may be adjusted on any regular or irregular basis (step 402). In various embodiments, the quality setting is recalculated (step 404) on any regular temporal basis (e.g., every second or so), any irregular logical basis (e.g., every n-th iteration of method 400, such as every tenth iteration or so), or on any other basis as desired. In an exemplary embodiment, method 400 repeats at a frequency of about every 100 ms or so (other embodiments may vary), with quality settings being recalculated on every tenth iteration or so, thereby resulting in recalculation about every second. Other embodiments may use other parameters, and/or may consider other factors as desired.

For example, quality settings may be recalculated in some embodiments when it is known that the encoding parameter has been adjusted; conversely, some embodiments may omit recalculation when it is known that the encoding parameter has not been adjusted since the last recalculation. Other embodiments may supplement or modify step 402 in any manner.

Quality settings are calculated according to any suitable parameters, constraints or techniques (step 404). Generally speaking, the quality settings are calculated based upon the then-current value of the adjusted parameter (e.g., bit rate, frame rate, resolution, and/or the like). In various embodiments, an average (or weighted average) of current and former parameter values may be used in determining the new quality settings, as appropriate. The amount of historical data used in creating the average can be determined in any manner, and historical data may be weighted as desired (e.g., so that older data is given less weight).

Data is gathered on any appropriate basis (step 406). In various embodiments, data is gathered on a relatively regular temporal basis (e.g., every 100 ms or so), although other embodiments may gather data on a more irregular or another basis. Data gathered in step 406 is any information that allows for the computation of network capacity, encoder bitrate, segment transmit times and/or other factors as appropriate. In various embodiments, data is gathered relating to the amount of network traffic (e.g., number of bytes or milliseconds of content) transferred since the last iteration of step 406, the amount of encoded data (e.g., in bytes or milliseconds) generated since the last iteration of step 406, and/or the current buffer occupancy level (e.g., expressed in bytes or milliseconds of data, and/or as a percentage of the total buffer capacity). Other factors or parameters may be collected in any number of alternate embodiments.

The gathered data is then processed to arrive at an estimate of network capacity, a calculated encoder rate (step 408), and/or any other values as desired. In various embodiments, the values gathered in step 406 may be averaged over any appropriate period of time (e.g., a second or so) to reduce the effects of relatively short term transients that may occur. Network capacity may be calculated based upon the average amount of network traffic transferred over some appropriate period of recent time (e.g., a second or so), for example. The encoder rate may be similarly calculated based upon actual and/or average saved encoder rates over a relevant period of time (e.g., a second or so). Hence, by tracking the rates by which the buffer 105 is filled (e.g., the encoder rate) and emptied (e.g., the network transmit rate), any discrepancies between the two can be readily identified. Similarly, average buffer occupancy over a relatively recent period of time can be used to estimate the current zone of operation. In various embodiments, the zone of operation may be adjusted based upon an average of fewer samples (e.g., representing a shorter period of time, such as about 0.5 sec or so) than the average time window used for the other calculations performed. The averages used to compute the various values may change with each iteration of method 400 so that the averages are effectively "sliding" averages, as appropriate. System processor load may also be considered in any manner. In various embodiments, processor over and/or underutilization can be tracked and compensated in any manner.

Changes in the encoding parameter may be made in any manner (steps 410 and 412). In various embodiments, the encoding parameter is evaluated upon each iteration of method 400 (e.g., on the order of every 100 ms or so) according to various criteria. In the exemplary embodiment shown in FIG. 4, the encoding parameter is adjusted when change occurs in the buffer utilization and/or segment transmit time, as appropriate (step 410). As the buffer utilization increases or decreases to a new state 302-310 (FIG. 3), for example, the rate can be adjusted to reflect the newer state. Segment transmit times may also be considered in any manner. Some embodiments may consider segment transmit times vis a vis the duration of the segment, or any other threshold value. If the segment transmit time is less than a relevant percentage of the segment duration, for example, then a higher setting may be warranted. Conversely, if the segment transmits time is greater than a certain percentage of the segment duration, then a lower encoder setting may be warranted. Different threshold values may be derived, calculated or otherwise formulated based upon observation and/or desired performance, as appropriate. Further, the particular state boundaries or watermarks used may vary from iteration to iteration of method 400 due to recalculations in step 404.

In some embodiments, only certain changes in buffer utilization and/or segment transmit time will trigger changes to the encoding parameter. As noted above, the encoding parameter may not be adjusted when, for example, operation traverses the state boundary separating "red" from "yellow" (and/or "yellow" from "green") operation to prevent overfilling of buffer 105, to allow buffer 105 to empty, and/or for any other reason. Other rules may be applied as desired so that parameter adjustments are not necessarily performed in response to all state transitions. Further, adjustments may be performed even when no state transition has occurred. Adjustments may be appropriate to "fine-tune" operation within an operating state, for example, or adjustments may be made based solely on the relative buffer fill and empty rates, the overall buffer utilization value and/or the segment transmit times without regard to whether a particular watermark has been breached or other state transition has occurred.

If a quality adjust is warranted, the particular encoding parameter may be adjusted upwardly or downwardly as desired (step 412). Encoding bit rate, for example, maybe increased or decreased to reflect increased or decreased network capability or transmit time, for example. The particular amount of change will depend upon the particular embodiment and various other factors. For example, bit rate changes may increase more aggressively when the buffer 105 is relatively empty and/or the segment transmit time is relatively low, since buffer space is available to compensate for any over-aggressiveness. Conversely, rate increases may be applied much more conservatively when buffer 105 is relatively full and/or the segment times are relatively long to prevent backlog. Transmit times may adjust these considerations in other ways, as noted herein, and other factors may be considered as appropriate.

In many embodiments, it may be undesirable to make too frequent changes to the encoding parameter. Maintaining at least some time interval between parameter changes can allow effective buffer utilization and can reduce any transient effects of short-lived changes in network capacity and/or processor load, thereby improving the user experience. This delay in time changes is reflected in a "time interval" parameter in FIG. 4 that can be adjusted as desired (steps 413 and 415). It may be beneficial, for example, to prevent subsequent parameter changes for a half-second or so (or for several seconds, as appropriate) after any change so that the effects of the change can be more carefully considered. In some embodiments, the amount of delay following a decrease in encoding quality may be less than the delay following an increase. In various embodiments, the time interval parameter set in step 415 may be considered at a later point (e.g., step 414) to determine if adjustments to the encoding quality are allowed.

In addition to allowing changes in the encoding parameter in response to changes in buffer utilization and/or segment transmit times, various embodiments further adjust the encoding parameters when conditions otherwise warrant (step 416). Quality adjustments may include any changes to the bit rate, frame rate, image resolution, audio or video quality, or any other parameters or features as desired. For example, the encoding parameter may be adjusted to match the network capacity calculations made in step 408. If the network rate is significantly greater or less than the encoding rate, for example, the encoding rate can be adjusted to match the network capability even if buffer utilization does not indicate a zone transition/watermark breach.

By adjusting the encoding quality in response to actual conditions, the performance of encoding system 102 can be substantially improved. By measuring and manipulating the fill and/or empty rates of buffer 105, (e.g., to adapt the fill and empty rates to each other as closely as possible) and/or by considering the effects of segment transmit times, the user experience can be significantly improved. Moreover, by considering processor utilization in adjusting the encoding parameters, the processor can be more effectively utilized, thereby preventing issues that can result from imbalance.

The particular techniques used to adjust one or more encoding parameters can vary significantly from embodiment to embodiment using the general concepts set forth herein. One detailed implementation is presented below that is intended as one example of the sorts of features that could be implemented in an exemplary encoding system or technique. The various parameters and values used in this example, however, are strictly for purposes of illustration, and are not intended as being exclusive or otherwise limiting.

FIG. 5 shows one example of a series of encoder quality determinations 502-518 that could be used in a placeshifting setting or the like in which an HTML 5 or other segmented media stream is encoded in response to real-time network conditions. Each of these determinations may be processed as part of function 408 above, or in any other manner. Many different alternate but equivalent embodiments could change any of the various parameters shown in the table as desired to create any number of different constraints, parameters and/or operating levels based upon any constraints. FIG. 5 is not intended to be limiting, but rather to provide one example of an actual implementation that considers both buffer utilization and segment transmit times in encoding a segmented media stream for placeshifting or other purposes.

In each portion of FIG. 5, one or more factors gathered from function 406 above are evaluated (see functions 408, 410, 414, 416 above) to determine and adjust the encoder settings for a segmented media stream. The factors considered in this example could include, without limitation: a periodic network throughput estimate ("NET"), a network throughput estimate during the active segment ("ACTIVE-NET"), a configured or otherwise set value for the encoder parameter ("SET"), a maximum encoder SET value achieved in the data connection ("PEAKSET", which may be the average of multiple samples), the time taken to send a segment ("NsendT", e.g., in milliseconds or other units of measure), the current buffered duration of data ("Cbuf", e.g., in milliseconds or other units of measure), the previous buffered duration ("Pbuf", e.g., in milliseconds or other units of measure), and/or the configured duration of each segment ("SEGDURATION", e.g., in milliseconds). Other embodiments may consider additional or alternate factors, as desired.

As shown in FIG. 5, determination 501 shows that the encoder quality may be set to a particular value (e.g., 50% of maximum capacity in the example of FIG. 5) if the network throughput estimate (NET) exceeds the configured encoder throughput (SET), and if the current throughput setting has not yet reached 50% (or so) of its maximum setting. This allows for a relatively quick ramp-up to operating capacity when substantial amounts of bandwidth are available. Note that "maximum setting" in this context could relate to the maximum capacity of the encoder, or the maximum capacity achieved during recent operation, or any other "maximum" value as desired. This determination 501 may be performed as often as desired in this example; alternate embodiments may use other parameters.

Determination 502 sets the encoder quality to the lesser of a default value (e.g., 300 kbps in this example) or 120% of its then-current value when the network throughput estimate is greater than the configured encoder setting and the current setting is less than 80% (or so) of its maximum capacity. Again, this allows faster ramp-up to operating speed when substantial bandwidth is available. In this example, determination 502 is performed after about 2 seconds have elapsed since the previous adjustment; other embodiments may use other parameters as desired.

Determination 503 increases the encoding parameter to the lesser of a default value (again, 300 kbps in this example) or 110% of the then-current rate when excess bandwidth exists and the time to send the segment is less than an appropriate value (e.g., 500 ms in this example). This reflects that excess transmit time and excess bandwidth are both available, so the encoding quality can be increased under such conditions.

Determination 504 similarly increases the encoding parameter when excess bandwidth is available and the time to send the buffered segment is less than 80% of the segment's duration. This check is only performed at 5-second intervals or so in this example to prevent excess adjustment, although other embodiments may use other parameters. Note that the consideration of the segment interval is in addition to the consideration of the buffer utilization, thereby allowing data from previous segment transmissions to affect the encoding of subsequent segments.

Determination 505 conversely "downshifts" to degrade the encoding parameter by a relatively small amount (e.g., 10% or so) when the network capacity is less than the current encoder capacity, the buffer is filling (e.g., Current buffer duration $C_{buff}$ exceeds the prior buffer duration $P_{buff}$), and the time to send the segment is greater than 70% of the segment duration. In the table shown in FIG. 5, determination 505 would take the operation out of the "bonus" watermark and into the "green" watermark under such conditions. Determination 506 would similarly degrade the quality setting by another 10% if similar conditions persist, thereby allowing segment transmit times to affect the encoding of subsequent segments. Determinations 507-509 continue to reduce the quality setting as the network bandwidth exceeds the current encoder setting and the buffer continues to fill. Determination 507 in this example reduces the encoder setting to 70% during "yellow" operation and determination 508 reduces the encoder setting to 60% of its current value during "red" operation. Determination 509 shows the encoder set to 50% of its current value when the buffer flushes. Again, any number of different determinations 501-509 could be formulated in other embodiments, each considering any number of alternate or additional parameters.

As described briefly above, encoder system 102 is configured to select an initial bit rate parameter for media streaming based on historical bit rate data, when available for a particular client, network, geographical location, and/or the like. That is, in order to facilitate more quickly reaching an optimum (e.g., maximum) bit rate for media streaming, encoder system 102 attempts to select a starting bit rate that is close to a bit rate that was previously used to stream media to that same client, based on client information as detailed below.

In that regard, FIG. 6 depicts a bit rate data structure 600 in accordance with one embodiment, which may be embodied within media encoder system 102 in any convenient form (e.g., as a data store provided within a local data storage component, as described above). In this embodiment, data store 600 includes a plurality of public IP addresses 610, a plurality of client identifiers 620, and a of the associated plurality of bit rates 630. More particularly, client IDs 621, 622, etc. correspond to unique IDs that are provided by (or otherwise associated with) the individual clients (104A, 104B, etc. of FIG. 1). Such IDs 620 might be provided by software (e.g., streaming software residing with clients 104), or hardware (e.g., a MAC address). Public IP addresses 611, 612 correspond to the IP addresses reverse resolved (by encoder system 102) for each client 104A, 104B during a previous streaming event. Similarly, bit rates 630 correspond to a bit rate used during the previous streaming event (e.g., the maximum, average, or last bit rate used).

As will be appreciated, multiple public IP addresses 610 might be associated with a single client ID 620, since a single device (e.g., a mobile streaming device) might be utilized by a user in multiple locations. For example, public IP address 611 might correspond to one client (with client ID 621) being used at an airport that provides public WiFi, while public IP address 612 might correspond to that same client (having client ID 621) being used within the home of the user.

FIG. 7 depicts a bit rate data structure in accordance with another embodiment. More particularly, data store 700 includes, as in data store 600, a public IP address 710 (e.g., 711-713), a client ID 720 (e.g., 721-723), and a bitrate 740 (e.g., 741-743), while also including a location field 730 (e.g., 731-733). Location 730 field may include any convenient indicia of the geographical location of the client device having the corresponding client ID 720. Thus, location 730 might correspond to latitude and longitude values as known in the art and commonly available in mobile devices having GPS modules provided therein. It will be appreciated that the location field 730 of data store 700 provides useful historical data over and above what is provided by data store 600. For example, a single physical site might include multiple internal routers, switches, and gateways, each of which might appear (externally) as a single public IP address 710, but might, in fact, have significantly different streaming capabilities. The location field 730 can then be used to further refine the initial bit rate 740 used for subsequent streaming (i.e., by inferring that the client 104 is closer to an access point or the like providing historically better bit rates).

Figure 8:
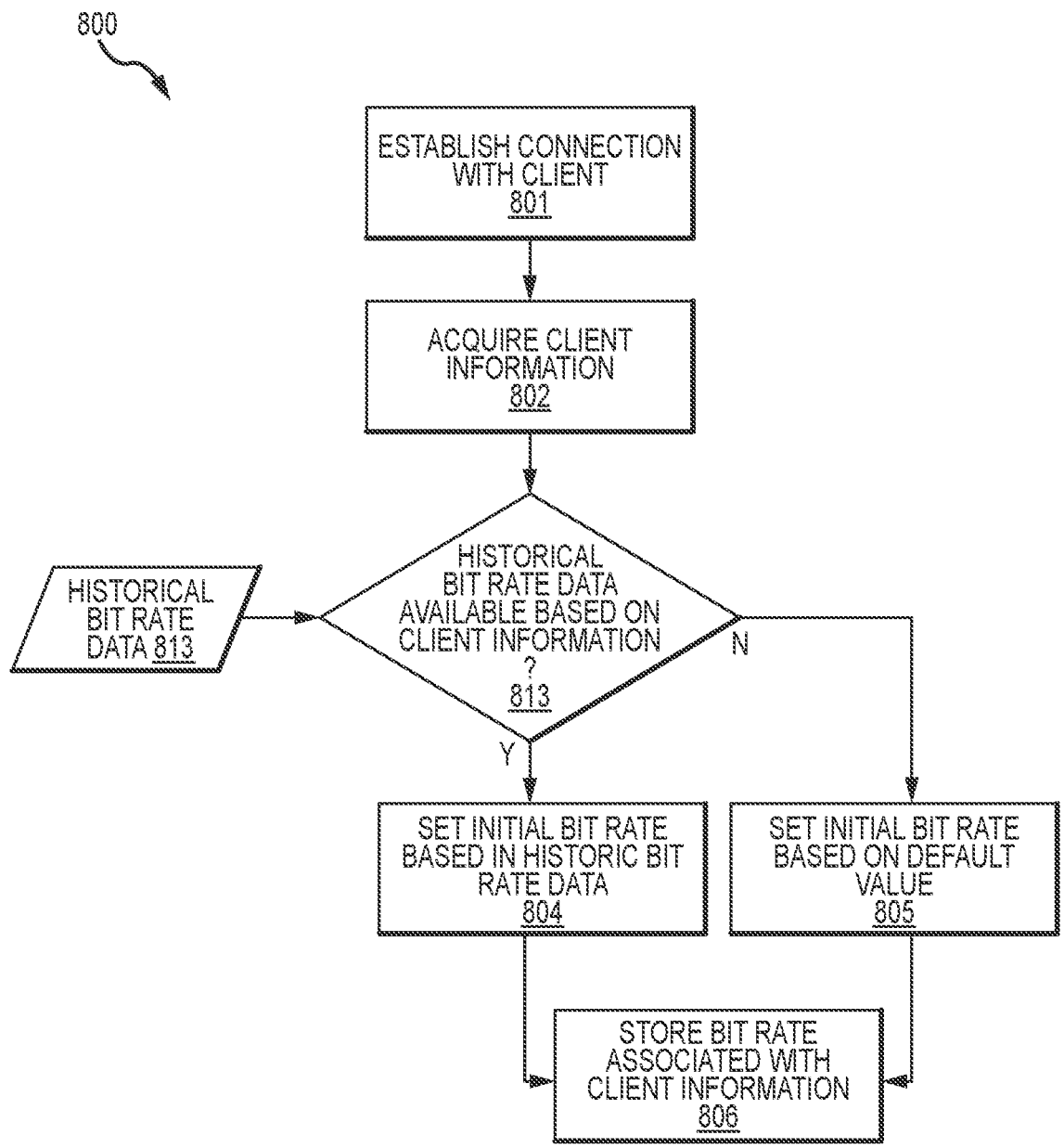
FIG. 8 is a flowchart for an exemplary process in accordance with various embodiments.

FIG. 8 depicts a flowchart 800 for an exemplary process in accordance with various embodiments and will be described in conjunction with previous FIGS. 1-7. Initially, at 801, a connection is established with a client 104 and/or an initial request for streaming has been received by encoder system 102 by a client 104. That is, step 801 corresponds to any step in which an initial bit rate is advantageously determined.

Next, at 802, client information (i.e., any information relating to client 104 that may be pertinent to determining an initial bit rate) is determined. This client information might include, for example, the client's apparent public IP address, the client ID (which might typically be sent by client 104 in a request for media streaming), geographical location information (e.g., GPS coordinates determined by client 104), and the like.

Once the client information is acquired, the system then determines, at 803, whether historical bit rate data is available for client 104 (via historical bit rate data store 813). This determination may be implemented in a variety of ways, including various decision trees, machine learning (ML) models, or the like. If the client information matches, in all material respects, an entry within the historical data store 700 (e.g., the same client ID 720 having the same public IP address 710 in substantially the same geographical location 730), the system will simply select the corresponding bit rate 740. In other cases, however, the client information may include partial and/or non-matching information. For example, a particular client ID 721 might appear at an unknown location 730 within an unknown public IP address 710. In such cases, the system might examine the location field 730 of other client IDs 720 during previous streaming sessions and estimate the initial bit-rate based on previous bit rates used near that location (e.g., an average or a minimum bit rate).

If historical bit rate data was available at step 803, the system (at 804) sets the initial, starting bit rate of streaming from encoder system 102 to client 104 equal to the bit rate (740). If not (at 805), some default values are selected for the initial bit rate. The default bit rate might typically be a relatively low bit rate that is adjusted upward as streaming progresses, as described in further detail above.

Finally, at 806, the bit rate associated with the client information (i.e., the current client information) is stored in historical data store 700. That is, periodically, or at the occurrence of predetermined events (e.g., when the media stream 120 is terminated), applicable bit rate information is recorded within the data store 700 to be used in the future. This information might include, for example, the applicable bit rate, the geographic location or region), the client ID, and the public IP address associated with the media streaming. The applicable bit rate might be the last-used bit rate, the average (successful) bit rate, the maximum successful bit rate, the minimum successful bit rate, or some other computed bitrate based on the media streaming session. In some embodiments, multiple bit rates are stored (e.g., minimum, average, maximum).

As noted above, the particular adjustments, transitions, transition parameters, timing parameters and other specific features of the preceding example are intended solely for purposes of illustration and are not meant to be limiting. Other embodiments may provide parameter rate adjustment techniques and systems that vary significantly from those described herein, and that use any number of alternate or additional parameters and parameter values.

The term "exemplary" is used herein to represent one example, instance or illustration that may have any number of alternates. Any implementation described herein as exemplary is not necessarily to be construed as preferred or advantageous over other implementations.

While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of elements described without departing from the scope of the claims and their legal equivalents.

The invention claimed is:

1. A method of encoding segments of a media stream provided from an encoding system to a remotely-located client that is associated with an identifier, the method comprising:
  establishing a data connection between the encoding system and the client via a network;
  determining if historical bit rate data is available based upon the identifier associated with the client;
  encoding a first portion of the media stream at an initial encoding quality, wherein the initial encoding quality is set based upon the historical bit rate data if the historical bit rate data is available for the identifier associated with the client, and otherwise set based upon a default value;
  storing the first portion of the media stream in a buffer until the first portion is transmitted to the client via the data connection; and
  adjusting the encoding quality of subsequent portions of the media stream based upon a buffer utilization breaching one of a set of watermarks, wherein each watermark is indicative of a transition point between states of a set of states each representing different levels of the buffer utilization.

2. The method of claim 1, further comprising:
  applying the set of watermarks to include adjustments within each state of the set of states configured with the buffer based upon actual measured and observed values of an encoder rate, the available buffer space and segment transmit time.

3. The method of claim 2, further comprising:
  adjusting the encoder rate based upon an amount of available buffer space that is tailored to an actual condition based on each state of the buffer rather than adjusting the encoder rate in accordance with a predetermined amount that is empirically determined at a different time.

4. The method of claim 1, further comprising:
  storing the initial encoding quality in association with the identifier of the client for use as historical bit rate data during a future media streaming session with the same client.

5. A media encoding system for providing a media stream to a client over a network, the media encoding system comprising a processor and a non-transitory data storage comprising a buffer, wherein the processor is configured to perform an automated process comprising:
  establishing a data connection between the media encoding system and the client via the network;
  determining if historical bit rate data is available based upon the identifier associated with the client;
  encoding a first portion of the media stream at an initial encoding quality, wherein the initial encoding quality is set based upon the historical bit rate data if the historical bit rate data is available for the identifier associated with the client, and otherwise set based upon a default value;
  storing the first portion of the media stream in a buffer until the first portion is transmitted to the client via the data connection; and
  adjusting the encoding quality of subsequent portions of the media stream based upon a buffer utilization breaching one of a set of watermarks, wherein each watermark is indicative of a transition point between states of a set of states each representing different levels of the buffer utilization.

6. The media encoding system of claim 5 wherein the automated process further comprises:
  applying the set of watermarks to include adjustments within each state of the set of states configured with the buffer based upon actual measured and observed values of an encoder rate, the available buffer space and segment transmit time.

7. The media encoding system of claim 6, wherein the automated process further comprises:
  adjusting the encoder rate based upon an amount of available buffer space that is tailored to an actual condition based on each state of the buffer rather than adjusting the encoder rate in accordance with a predetermined amount that is empirically determined at a different time.

8. The media encoding system of claim 7 wherein the automated process further comprises storing the initial encoding quality in association with the identifier of the client for use as historical bit rate data during a future media streaming session with the same client.

9. A video encoder device configured to supply a media stream to a remotely-located client device associated with an identifier via a network, the video encoder device comprising:
  an interface to the network;
  a data storage configured as a buffer; and
  a processor configured to perform an automated process comprising:
    establishing a data connection between the encoding system and the client via the interface;
    determining if historical bit rate data is available based upon the identifier associated with the client;
    encoding a first portion of the media stream at an initial encoding quality, wherein the initial encoding quality is set based upon the historical bit rate data if the historical bit rate data is available for the identifier associated with the client, and otherwise set based upon a default value;
    storing the first portion of the media stream in a buffer until the first portion is transmitted to the client via the data connection; and
    adjusting the encoding quality of subsequent portions of the media stream based upon a buffer utilization breaching one of a set of watermarks, wherein each watermark is indicative of a transition point between states of a set of states each representing different levels of the buffer utilization.

10. The video encoder device of claim 9, wherein the processor is further configured to store the initial encoding quality in association with the identifier of the client for use as historical bit rate data during a future media streaming session with the same client.

* * * * *